(12) United States Patent
Pisklak et al.

(10) Patent No.: US 11,041,108 B2
(45) Date of Patent: Jun. 22, 2021

(54) PHOSPHORYLATED AMINO POLYCARBOXYLIC ACID CEMENT RETARDER

(71) Applicant: Halliburton Energy Services, Inc., Houston, TX (US)

(72) Inventors: Thomas Jason Pisklak, Cypress, TX (US); Aaron Michael Beuterbaugh, Middle Spring, TX (US); Aleksey V. Kolasnikov, Houston, TX (US)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 0 days.

(21) Appl. No.: 16/582,121

(22) Filed: Sep. 25, 2019

(65) Prior Publication Data

US 2021/0087458 A1 Mar. 25, 2021

(51) Int. Cl.

| | |
|---|---|
| *C09K 8/487* | (2006.01) |
| *C04B 28/04* | (2006.01) |
| *C04B 28/18* | (2006.01) |
| *C04B 24/00* | (2006.01) |
| *C04B 40/06* | (2006.01) |
| *C04B 14/06* | (2006.01) |
| *E21B 33/138* | (2006.01) |

(Continued)

(52) U.S. Cl.
CPC ............. *C09K 8/487* (2013.01); *C04B 14/06* (2013.01); *C04B 24/003* (2013.01); *C04B 28/04* (2013.01); *C04B 28/18* (2013.01); *C04B 40/0039* (2013.01); *C04B 40/0625* (2013.01); *C04B 40/0658* (2013.01); *E21B 33/14* (2013.01); *C04B 2103/12* (2013.01); *C04B 2103/22* (2013.01); *C04B 2103/44* (2013.01); *C04B 2103/46* (2013.01); *C04B 2111/00146* (2013.01)

(58) Field of Classification Search
CPC ...... C09K 8/467; C09K 8/46; C04B 2103/22; C04B 24/003; E21B 33/13; E21B 33/14; E21B 33/138; E21B 21/003
See application file for complete search history.

(56) References Cited

U.S. PATENT DOCUMENTS

| | | | |
|---|---|---|---|
| 4,676,832 A | 6/1987 | Childs et al. | |
| 5,417,759 A | 5/1995 | Huddleston | |

(Continued)

FOREIGN PATENT DOCUMENTS

WO 2018156117 A1 8/2018

OTHER PUBLICATIONS

International Search Report dated Jun. 23, 2020, issued in related International Application No. PCT/US2019/053283.

*Primary Examiner* — Zakiya W Bates
(74) *Attorney, Agent, or Firm* — McGuireWoods LLP

(57) ABSTRACT

A variety of systems, methods and compositions are disclosed, including, in one method, a method of cementing may comprise: providing a cement composition comprising: a hydraulic cement comprising Portland cement in an amount of about 50% by weight of hydraulic cement or less, water, and a phosphorylated amino polycarboxylic acid cement retarder; placing the cement composition in a wellbore; and allowing the cement composition to set. A cement composition, the composition comprising: a hydraulic cement comprising Portland cement in an amount of about 50% by weight of hydraulic cement or less; water; and a phosphorylated amino polycarboxylic acid cement retarder.

20 Claims, 4 Drawing Sheets

(51) Int. Cl.
  *C04B 40/00* (2006.01)
  *C04B 111/00* (2006.01)
  *C04B 103/22* (2006.01)
  *C04B 103/12* (2006.01)
  *C04B 103/46* (2006.01)
  *C04B 103/44* (2006.01)
  *E21B 33/14* (2006.01)

(56) References Cited

U.S. PATENT DOCUMENTS

| | | | |
|---|---|---|---|
| 6,451,881 B1 * | 9/2002 | Vickers, Jr. | C04B 24/006 |
| | | | 524/2 |
| 8,851,173 B2 | 10/2014 | Brothers et al. | |
| 9,434,647 B2 | 9/2016 | Taquet et al. | |
| 9,540,560 B2 | 1/2017 | Beuterbaugh et al. | |
| 9,745,506 B2 | 8/2017 | Reyes et al. | |
| 9,809,716 B2 | 11/2017 | Beuterbaugh et al. | |
| 9,890,320 B2 | 2/2018 | Reyes et al. | |
| 9,982,186 B2 | 5/2018 | Beuterbaugh et al. | |
| 10,150,904 B1 | 12/2018 | Rahman et al. | |
| 10,190,034 B2 | 1/2019 | Le Blanc et al. | |
| 2014/0216746 A1 * | 8/2014 | Ballew | E21B 33/13 |
| | | | 166/294 |
| 2017/0306211 A1 | 10/2017 | Pisklak et al. | |
| 2019/0031941 A1 | 1/2019 | Chatterji et al. | |

* cited by examiner

PHOSPHORYLATED AMINO POLYCARBOXYLIC ACID CEMENT RETARDER

BACKGROUND

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into a wellbore annulus between the walls of the well bore and the exterior surface of the pipe string disposed therein or between the pipe string and a larger conduit. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation or larger conduit. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

Subterranean cementing operations generally occur under a wide variety of well bore conditions, for example, ranging from shallow wells (less than about 1,000 feet) to extremely deep wells (greater than about 35,000 feet). A fluid is considered to be in a pumpable fluid state where the fluid has a consistency of less than 70 Bearden units of consistency ("Bc"), as measured using a pressurized consistometer in accordance with the procedure for determining cement thickening times set forth in API RP Practice 10B-2, *Recommended Practice for Testing Well Cements*, First Edition, July 2005. The time a cement composition remains in a pumpable fluid state is generally referred to as the thickening time.

BRIEF DESCRIPTION OF THE DRAWINGS

These drawings illustrate certain aspects of some of the systems, methods and compositions of the present disclosure, and should not be used to limit or define the systems, methods and/or cement compositions.

DETAILED DESCRIPTION

Figure 1:
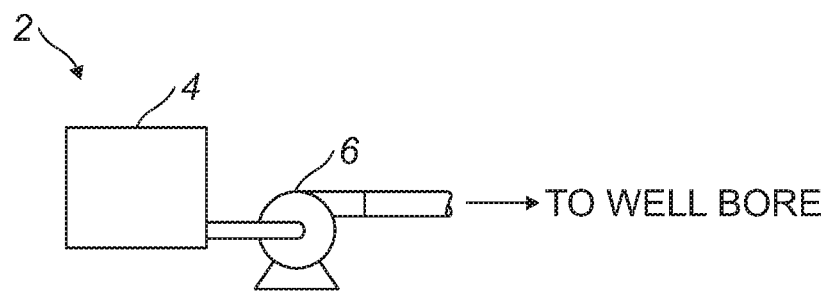
FIG. 1 is a schematic diagram that illustrates a system for preparation and delivery of a cement composition to a wellbore in accordance with certain examples.

Systems, methods, and compositions are directed to cementing operations and, in certain systems and methods, to cement compositions comprising a phosphorylated amino polycarboxylic acid cement retarder and methods of cementing with the phosphorylated amino polycarboxylic acid cement retarder in subterranean applications. While the systems, compositions, and methods may be useful in a variety of applications, they may be particularly useful for subterranean well completion and remedial operations, such as primary cementing of casings and liners in well bores, including those in production wells, which include multilateral subterranean wells. They also may be useful for surface cementing operations, including construction cementing operations. Additionally, they may be useful for offshore cementing applications.

There may be several potential advantages to the systems, methods and cement compositions of the present disclosure, only some of which may be alluded to herein. One of the many potential advantages of the systems, methods and cement compositions of the present disclosure is that the phosphorylated amino polycarboxylic acid cement retarder may be used at a wide range of temperatures. One skilled in the art would appreciate, based on the teachings of the present disclosure, that it may also be used at higher temperatures, reducing the amount of retarder needed for a cementing job. Another potential advantage of the systems, methods and cement compositions of the present disclosure is that the phosphorylated amino polycarboxylic acid cement retarder may not require an additional set retarder. This may be particularly useful for operations offshore, as it may reduce the rig space requirement and logistics.

The cement compositions may comprise a cement, a phosphorylated amino polycarboxylic acid cement retarder, and water. By way of example, the cement composition may have a density in the range of from about 4 pounds per gallon ("ppg") (479.3 kilogram per cubic meter ("kg/m$^3$")) to about 25 ppg (2,996 kg/m$^3$). In certain embodiments, the cement compositions may have a density in the range of from about 8 ppg (958.6 kg/m$^3$) to about 17 ppg (2,037 kg/m$^3$). The cement compositions may be foamed or unfoamed or may comprise other means to reduce their densities, such as hollow microspheres, low-density elastic beads, or other density-reducing additives known in the art.

The cement compositions may comprise a cement. Any of a variety of cements suitable for use in subterranean cementing operations may be used in accordance with the methods and cement compositions of the present disclosure. Suitable examples include hydraulic cements that comprise calcium, aluminum, silicon, oxygen and/or sulfur, which set and harden by reaction with water. Cements may include, but are not limited to, Portland cements, pozzolan cements, gypsum cements, high-alumina-content cements, slag cements, silica cements and combinations thereof. The cement may be included in the cement compositions in any suitable amount, including, but not limited to, about 20% to about 80% by weight of the cement composition ("BWOC"). Suitable amounts may include, but are not limited to, 20%, 30%, 40%, 50%, 60%, 70%, or 80% by weight of the cement composition. Those of ordinary skill in the art, with the benefit of this disclosure, should be able to select an appropriate concentration of the cement for a particular application. In certain embodiments, the cement composition may be a low Portland cement. As used herein, "low Portland cement" refers to a cement composition comprising Portland cement in an amount of about 50% or less BWOC. Alternatively, the cement composition may be a non-Portland cement. As used herein, "non-Portland cement" refers to a cement composition that does not comprise Portland cement. In certain embodiments, the cement composition may be substantially free of Portland cement. As used herein, "substantially free of Portland cement" refers to a cement composition comprising about 5% by weight of the cement composition or less of Portland cement.

In certain embodiments, the cement composition may comprise a Portland cement. Portland cements that may be suited for use in some methods and cement compositions of the present disclosure may be classified as Class A, C, H and G cements according to American Petroleum Institute, API Specification for Materials and Testing for Well Cements, API Specification 10, Fifth Ed., Jul. 1, 1990. In addition, in some methods and cement compositions, hydraulic cements suitable for use in the present disclosure may be classified as ASTM Type I, II, or III. Portland cement may be present in the cement composition in an amount of about 50% BWOC or less. In certain embodiments, Portland cement may be present in the cement composition in an amount of about 1% to about 10%, or about 10% to about 20%, or about 20% to about 30%, or about 30% to about 40%, or about 40% to about 50% BWOC, or any value or range of values therein. In certain embodiments, Portland cement may not be present in the cement composition.

In certain embodiments, the cement composition may comprise pozzolan. As used herein, "pozzolan" may be defined as a siliceous or silico-aluminous material that, when in a finely divided form and in the presence of moisture, may chemically react with calcium hydroxide at standard temperatures to form compounds that may have cementitious properties. The pozzolan may comprise a silica source. Any suitable silica source may be used. Examples of suitable silica source may include fly ash, slag, silica fume, fumed silica, crystalline silica, silica flour, cement kiln dust ("CKD"), natural glasses, metakaolin, diatomaceous earth, zeolite, shale, agricultural waste ash (e.g. rice husk, ash, sugar cane ash, and bagasse ash), and any combination thereof. Some specific examples of the silica sources will be discussed in more detail below. Pozzolan may be present in the cement composition in an amount sufficient to provide the desired compressive strength, density, and cost, including but not limited to, about 40% to about 80%, or about 1% to about 90%, or about 1% to about 60%, or about 50% to about 90% BWOC, or any values or ranges of values therein.

An example of a suitable silica source may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions may be necessary for a composite cement composition comprising Class F fly ash. In some embodiments, lime may be mixed with Class F fly ash in an amount in the range of about 0.1% to about 100% by weight of the fly ash. In some instances, the lime may be hydrated lime.

Another example of a suitable silica source may comprise slag. Slag is generally a by-product in the production of various metals from their corresponding ores. By way of example, the production of cast iron may produce slag as a granulated, blast furnace by-product wherein the slag generally comprises the oxidized impurities found in iron ore. Slag generally does not contain sufficient basic material, so slag may be used with a base to produce a settable composition that may react with water to set to form a hardened mass. Examples of suitable sources of bases include, but are not limited to, sodium hydroxide, sodium bicarbonate, sodium carbonate, lime, calcium oxide, calcium hydroxide, cement kiln dust, lime kiln dust, Portland cement, and combinations thereof.

Another example of a suitable silica source may comprise CKD. Cement kiln dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal.

Another example of a suitable silica source may comprise natural glass. Certain natural glass may exhibit cementitious properties, in that they may set and harden in the presence of hydrated lime and water. The natural glass may also be ground, for example. Generally, the natural glass may have any particle size distribution as desired for a particular application. In certain examples, the natural glass may have a mean particle size in the range of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, should be able to select a natural glass and particle size suitable for use for a chosen application.

Another example of a suitable silica source may comprise zeolite. Zeolites generally are porous alumino-silicate minerals that may be either a natural or synthetic material. Natural zeolites may be mined from the Earth's surface. Synthetic zeolites may also be used, which are lab created. Synthetic zeolites are based on the same type of structural cell as natural zeolites, and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may comprise zeolite in combination with a cation such as $Na^+$, $K^+$, $Ca^{2+}$, $Mg^{2+}$, etc. Zeolites comprising cations such as sodium may also provide additional cation sources to the cement composition as the zeolites dissolve.

The cement composition may include lime. As used herein, the term "hydrated lime" will be understood to mean calcium hydroxide. The hydrated lime may be included in embodiments of the cement composition, for example, to form a hydraulic composition with the natural glass. For example, the hydrated lime may be included in a natural glass-to hydrated-lime weight ratio of about 10:1 to about 1:1 or about—3:1 to about 5:1. Where present, the hydrated lime may be included in the cement composition in an amount in the range from about 10% to about 30% BWOC, for example. In certain embodiments, the hydrated lime may be present in an amount of about 10%, about 20%, or about 30% BWOC, or any value or range of values therein. In certain embodiments, the cement composition may consist of the natural glass and the hydrated lime. For example, the cement composition may primarily comprise the natural glass and the hydrated lime without any additional components (e.g., Portland cement, fly ash, slag cement) that hydraulically set in the presence of water.

The cement composition may comprise a phosphorylated amino polycarboxylic acid cement retarder. The phosphorylated amino polycarboxylic acid cement retarder may be included in the cement composition because of its control over the thickening time at high and low temperatures. In addition, the phosphorylated amino polycarboxylic acid cement retarder may not show deterioration on the rate of strength development at various temperatures. In certain embodiments, the phosphorylated amino polycarboxylic acid cement retarder may be added to a cement composition in a liquid form or may be a dried solid. The phosphorylated amino polycarboxylic acid cement retarder may be present in any amount suitable, including an amount of about 0.001% BWOC to about 5.0% BWOC, or any value or range of values therein. In certain embodiments, on a weight for weight basis, the concentration of a phosphorylated amino polycarboxylic acid cement retarder required to retard a cement composition may be less than the concentration of conventional cement retarders required to provide similar retardation of a cement composition. In certain embodiments, the concentration of a phosphorylated amino polycarboxylic acid cement retarder required to retard a cement composition may be at least about 50% to about 75% (by weight) less than the concentration of conventional retarders present in a cement composition required to provide the same functionality.

A generic structure of a suitable phosphorylated amino polycarboxylic acid cement retarder is provided below:

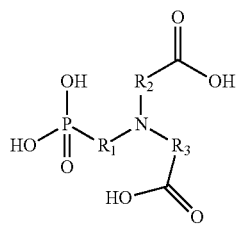

where $R_1$ may be selected from the group consisting of an alkyl group, an alkenyl group, an alkynly group, a heteroatom substituted alkyl group, a branched alkyl, a branched alkenyl, a alkyl alcohol, an alkoxylated heterocyclic group, a cycloalkyl group, a heteroatom substituted alkenyl group, the like, or any combinations thereof, wherein $R_2$ may be selected from the group consisting of an alkyl group, an alkenyl group, an alknyl group, a branched alkyl, a branched alkenyl, an alkyl alcohol, an alkoxylated heterocyclic group, a cycloalkyl groups, a heteroatom substituted alkyl group, a heteroatom substituted alkenyl group, the like, or any combinations thereof, wherein $R_3$ may be selected from the group consisting of an alkyl group, an alkenyl group, an alknyl group, a branched alkyl, a branched alkenyl, an alkyl alcohol, an alkoxylated heterocyclic group, a cycloalkyl group, a heteroatom substituted alkyl group, a heteroatom substituted alkenyl group, the like, or any combinations thereof. In certain embodiments, R1, R2, and R3 may be substituted with heteroatoms including, but not limited to, nitrogen, oxygen, sulfur, or ammonium. The alkyl, alkenyl, or alkynly groups of R1, R2, and R3 may be the same or different and, in certain embodiments may include 1 carbon atom to 22 carbon atoms, or, more particularly 1 carbon atoms to 5 carbon atoms. In a non-limiting embodiment, R1, R2, and R3 may be functionalized with a functional group so long as an ionic bond is not formed. In certain embodiments, the phosphorylated amino polycarboxylic acid cement retarder is N-Phosphonomethyl Iminodiacetic acid ("PMIDA").

In certain embodiments, a suitable phosphorylated amino polycarboxylic acid cement retarder may have a number average molecular weight in the range of about 150 to about 350, or from about 185 to about 300, or from about 150 or less, or from about 350 or greater. As used herein, the term "number average molecular weight" generally refers to a molecular weight measurement that is calculated by dividing the total weight of all the polymer molecules in a sample with the total number of polymer molecules in the sample. Experimentally, the number average molecular weight is determined by analyzing a sample divided into molecular weight fractions of species i having n the number of molecules. The number average molecular weight can be measured by a variety of well-known methods including gel permeation chromatography characterization based on a narrow distribution of polyethylene glycol and polyethylene oxide calibration standards, spectroscopic end group analysis and osmometry. A person skilled in the art will recognize the appropriate method for determining the number weight molecular average for a particular application.

In certain embodiments, the phosphorylated amino polycarboxylic acid cement retarder may be fully protonated in form before the phosphorylated amino polycarboxylic acid cement retarder is added to the cement composition. In certain embodiments, the fully protonated phosphorylated amino polycarboxylic acid cement retarder may be advantageous in on-shore subterranean operations.

In certain embodiments, the phosphorylated amino polycarboxylic acid cement retarder may be neutral in form before it is added to a cement composition. A phosphorylated amino polycarboxylic acid cement retarder in neutral form may be advantageous in off-shore subterranean operations. Optionally, the neutral form of the phosphorylated amino polycarboxylic acid cement retarder may further comprise alkali earth metal salts, alkaline earth metal salts, metal complexes with a d10 orbital, including, but not limited to, sodium, potassium, calcium, lithium, rubidium, caesium, francium, beryllium, magnesium, strontium, barium, radium, palladium, nickel, copper, silver, zinc, gold, roentgenium, cadmium, mercury, ununbiium, the like, and any combinations thereof. Optionally, the neutral form of the phosphorylated amino polycarboxylic acid cement retarder may further comprise ammonium, alkyl ammonium, alkonol ammonium, the like, or any combinations thereof.

In certain embodiments, the phosphorylated amino polycarboxylic acid cement retarder may have a pH of less than about 2. In certain embodiments, the pH of a phosphorylated amino polycarboxylic acid cement retarder may be dependent on the acidic functional groups present. In certain embodiments, a phosphorylated amino polycarboxylic acid cement retarder with a pH of less than 2 about may be solid in form. In certain embodiments, the phosphorylated amino polycarboxylic acid cement retarder may have a pH of greater than about 7. In certain embodiments, a pH of greater than about 7 may be achieved by mixing the phosphorylated amino polycarboxylic acid cement retarder with a base. In a non-limiting example, a suitable base may include a cement slurry. In certain embodiments, the phosphorylated amino polycarboxylic acid cement retarder may have a pH of about equal to the pH of the overall cement composition. In certain embodiments, cement may be a high pH buffer. When acidic compounds are added, the inherent acid base chemistry may drive the composition to about the native pH of cement. In certain embodiments, the native pH of cement may be about 12 to about 13.5, or any value or range of values therein. It should be noted that one of ordinary skill in the art, along with the present disclosure, may be able to determine the desired pH of the phosphorylated amino polycarboxylic acid cement retarder for a give application and should not be limited herein.

The water used in the cement compositions may be fresh water or salt water. As used herein, the term "salt water" refers to unsaturated salt water and saturated salt water, including brines and seawater. Generally, the water may be from any source, provided that it should not contain an excess of compounds that may undesirably affect other components in the cement composition. Further, the water may be present in an amount sufficient to form a pumpable slurry. Suitable amounts of water may be present in the cement composition in an amount including, but not limited to, about 20% to about 100% BWOC. For example, the water may be present in the cement composition in the range of about 30% to about 60% BWOC. One of ordinary skill in the art with the benefit of this disclosure will recognize the appropriate amount of water for a chosen application.

In certain embodiments, a strength retrogression additive may be included in the cement composition. Any suitable strength retrogression additive may be used including, but are not limited to, coarse silica flour, fine silica flour, and or a combination thereof. The strength retrogression additive may be present in any suitable amount. Suitable amounts may include, but are not limited to, about 10% to about 50% BWOC, or about 25% to about 45% BWOC. Suitable amounts of strength retrogressive additive may include, but are not limited to, 35% BWOC. Those of ordinary skill in the art, with the benefit of this disclosure, will be able to select the appropriate type and amount of the strength regression additive to include in the cement compositions of the present invention for a particular application.

The cement compositions may include a fluid loss control additive to reduce the loss of fluid, for example, water, from the cement compositions when they contact permeable subterranean formations or zones. Excessive fluid loss may cause a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore. Certain polymers have been used heretofore as fluid loss control additives in cementing operations. Suitable fluid loss control additives may include, but are not limited to, cellulosic materials such as hydroxyethyl cellulose and carboxymethylhydroxyethyl cellulose, copolymers of 2-acrylamido-2-methylpropanesulfonic acid and acrylamide or N,N-dimethylacrylamide, graft copolymers comprising a backbone of lignin or lignite and pendant groups comprising at least one member selected from the group consisting of 2-acrylamido-2-methylpropanesulfonic acid, acrylonitirile, and N,N-dimethylacrylamide and or any combinations thereof. Fluid loss control additives may be present in any suitable amount. A suitable amount may include, but is not limited to, about 0.01% to about 10.0% BWOC, or about 0.5% to about 3.0% BWOC. One of ordinary skill in the art, with the benefit of this disclosure, will be able to select the appropriate type and amount of the fluid loss control additive to include in the cement compositions of the present invention for a particular application.

Cement compositions may experience rheological problems over the duration of the placement period if not properly prepared. One such problem may be the settling of solids in embodiments comprising cement compositions. If the solids are not adequately suspended in the composition, the composition may segregate and be unusable. Methods to counteract this issue may include the use of water viscosifying suspension additives such as polymeric additives or frequent agitation to maintain the solids suspension. Examples may include any viscosifier formulated in the optimal amount and/or polysaccharide biopolymer subgroups including: scieroglucan, carragenans, xanthan, welan, diutan gums, celluloses, hydroxyl ethyl celluloses as well as alternatives such as: synthetic polymer viscosifiers, e.g. high molecular weight acrylamide polymers, acrylic acid-acrylamide co-polymers, and acrylamide co-polymers. However, these solutions may be expensive and time-consuming. The suspension additives may be present in any suitable amount, including, but not limited to, an amount of about 0.01% to about 10.0% BWOC, or about 0.1% to about 2.0% BWOC, or any value, or range of values therein.

Other additives suitable for use in subterranean cementing operations also may be added to the cement compositions as desired by those of ordinary skill in the art. Examples of such additives include, but are not limited to, additional set retarders, set accelerators, weighting agents, lightweight additives, gas-generating additives, mechanical property enhancing additives, lost-circulation materials, dispersants, foaming agents, defoaming agents, thixotropic additives, gas, and combinations thereof. Specific examples of these, and other, additives include salts, fibers, hydratable clays, calcined shale, vitrified shale, microspheres, diatomaceous earth, metakaolin, rice husk ash, natural pozzolan, elastomers, resins, latex, combinations thereof, and the like. A person having ordinary skill in the art, with the benefit of this disclosure, will readily be able to determine the type and amount of additive useful for a particular application and desired result.

The cement compositions may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 200 psi (about 15 bar) to about 10,000 psi (about 690 bar), alternatively, from about 500 psi (about 35 bar) to about 2,000 psi (about 140 bar), or any value or range of values therein. Without limitation, the cement compositions may develop a compressive strength in 24 hours of at least about 200 psi (15 bar), at least about 500 psi (about 35 bar), at least about 1000 psi (about 70 bar), or more. The compressive strength values may be determined using destructive or non-destructive methods at any temperature, however compressive strength development at temperatures above 400° F. may be of particular importance for potential use in subterranean formations having relatively high bottom hole static temperatures.

In some examples, the cement compositions may have desirable thickening times. The phosphorylated amino polycarboxylic acid cement retarder may be used for a wide range of temperatures. The phosphorylated amino polycarboxylic acid cement retarder may operate at a bottomhole circulating temperature of about 0.1° C. to about 250° C., or about 0.1° C. to about 50° C., or about 50° C. to about 150° C., or about 150° C. to about 250° C., or any value or range of values therein. Thickening time typically refers to the time a fluid, such as the cement composition, remains in a fluid state capable of being pumped. As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The cement compositions may have thickening times greater than about 0.5 hour, or alternatively greater than about 12.0 hours at 3000 psi (about 200 bar) or more (depending on well depth) and temperatures in a range of from about 0.1° C. to about 250° C., or about 0.1° C. to about 50° C., or about 50° C. to about 150° C., or about 150° C. to about 250° C., or any value or range of values therein. In certain embodiments, a cement composition comprising a phosphorylated amino polycarboxylic acid cement retarder may have a thickening time of about 4 hours to about 12 hours when exposed to temperatures of about 0° C. to about 250° C., wherein the cement composition may develop a 24 hour compressive strength of about 200 psi or greater.

In certain embodiments, the cement composition comprising the phosphorylated amino polycarboxylic acid cement retarder may be a set-delayed cement composition. The set-delayed cement composition may further comprise a dispersant and a chemical set activator. In certain embodiments, any suitable dispersant may be used including, but not limited to, sulfonated-formaldehyde-based dispersants, polycarboxylated ether dispersants, the like, or any combinations thereof. Any suitable chemical set activator may be used including, but not limited to, calcium chloride, triethanolamine, sodium silicate, zinc formate, calcium acetate, sodium hydroxide, a monovalent salt, nanosilica a polyphosphate. In certain embodiments, the set-delayed cement composition may further comprise an additional set retarder. Suitable examples of an additional set retarder may include, but is not limited to, a ligonosulfate retarder, the like, or any combinations thereof. In certain embodiments, the cement composition may be substantially free of Portland cement. As used herein, "substantially free of Portland cement" refers to a cement composition comprising about 5% by weight of the cement composition or less of Portland cement.

The set-delayed cement composition may remain in a pumpable fluid state for at least about 1 day or longer at room temperature (about 25° C.) in quiescent storage. When desired for use, the set-delayed cement compositions should be capable of activation and consequently develop reasonable compressive strengths. For example, a cement set activator may be added to a set-delayed cement composition to induce the composition to set into a hardened mass. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. This may be particularly useful for offshore cementing operations where space onboard the vessels may be limited.

In certain embodiments, the cement composition comprising the phosphorylated amino polycarboxylic acid cement retarder may display right angle set. Herein, right angle set refers to the near right angle (about 90 degrees plus about 5 degrees) increase in viscosity (or consistency) shown in a plot of viscosity (or consistency) over time for the cement composition comprising the phosphorylated amino polycarboxylic acid cement retarder. Specifically, it refers to the ability of the cement composition to exhibit a relatively constant viscosity for a period of time after they are initially prepared and while they are being placed in their intended locations in the wellbore, i.e., during the period when the cement composition is in motion. Eventually, the cement compositions quickly set such that the viscosity (or consistency) increases from about 5 Bc to equal to or higher than about 90 Bc in equal to or less than about 30 minutes. Alternatively, the viscosity may increase from about 5 Bc to or equal to about 130 Bc in equal to or less than about 30 minutes. This sudden jump in viscosity may be very desirable in preventing unwanted events such as gas or water migration into the slurry because it indicates the quick formation of impermeable mass from a gelled state after placement. A sufficient amount of the phosphorylated amino polycarboxylic acid cement retarder may be included in the cement composition to encourage the right angle set.

In accordance with the systems, methods, and cement compositions of the present disclosure, a cement composition may be introduced into a selected location and allowed to set therein. As will be appreciated, the selected location may any suitable location above ground or in a subterranean formation where it is desired for the cement composition to set into a hardened mass. For example, the selected location may be a wellbore annulus between a pipe string located in a subterranean formation and the subterranean formation or between the pipe string and a larger conduit. As described above, the methods and cement compositions of the present disclosure generally comprise a cement, a phosphorylated amino polycarboxylic acid cement retarder, and water.

The methods and cement compositions of the present disclosure may be used in a variety of subterranean applications, including primary and remedial cementing. The cement compositions may be introduced into a wellbore and allowed to set. The methods and cement compositions may comprise cement, the phosphorylated amino polycarboxylic acid cement retarder, and water. By way of example, in example primary cementing applications, a cement composition may be introduced into a wellbore or between a subterranean formation and a pipe string (or between a pipe string and a larger conduit) located in the subterranean formation. The cement composition may be allowed to set to form a hardened mass in the wellbore annulus. In addition, in example remedial cementing applications, a cement composition may be used, for example, in squeeze cementing operations or in the placement of cement plugs.

Referring now to FIG. 1, preparation of a cement composition in accordance with example systems, methods, and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the phosphorylated amino polycarboxylic acid cement retarder with the water (and other cement composition components) as it is being pumped to the wellbore.

Figure 2A:
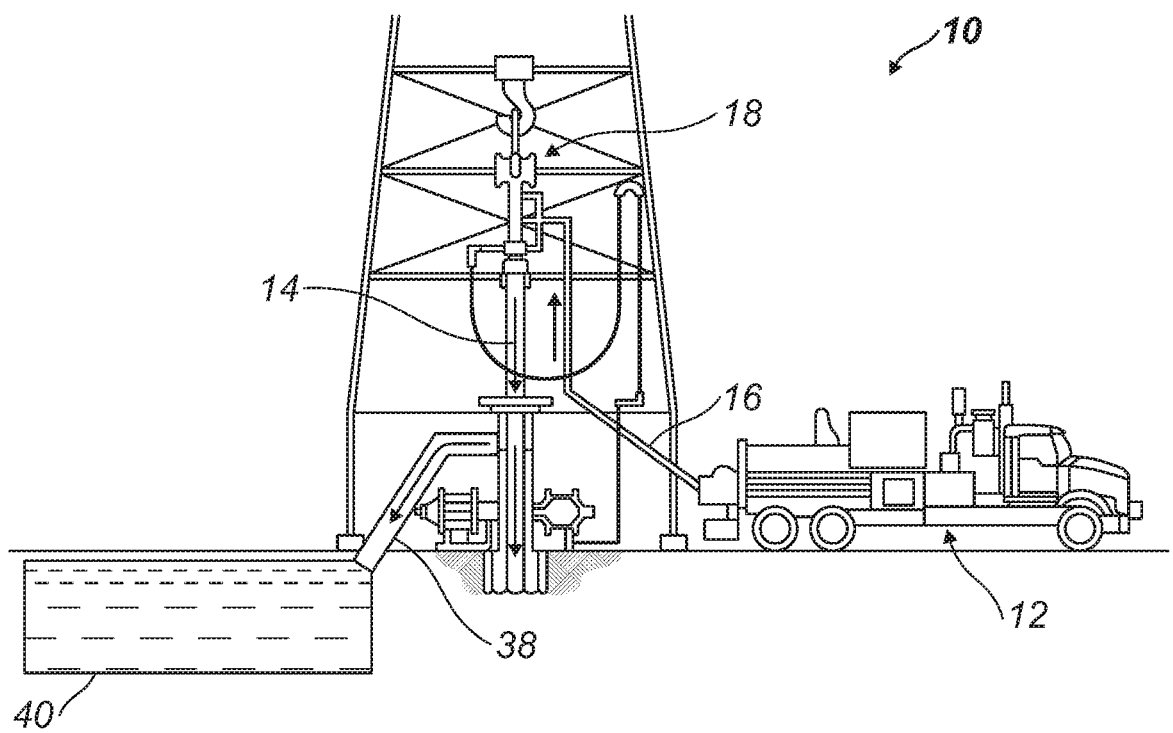
FIG. 2A is a schematic diagram that illustrates surface equipment that may be used in placement of a cement composition in a wellbore in accordance with certain examples.

An example technique for placing a cement composition into a subterranean formation will now be described with reference to FIGS. 2A and 2B. FIG. 2A illustrates surface equipment 10 that may be used in placement of a cement composition in accordance with certain systems, methods and cement compositions. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
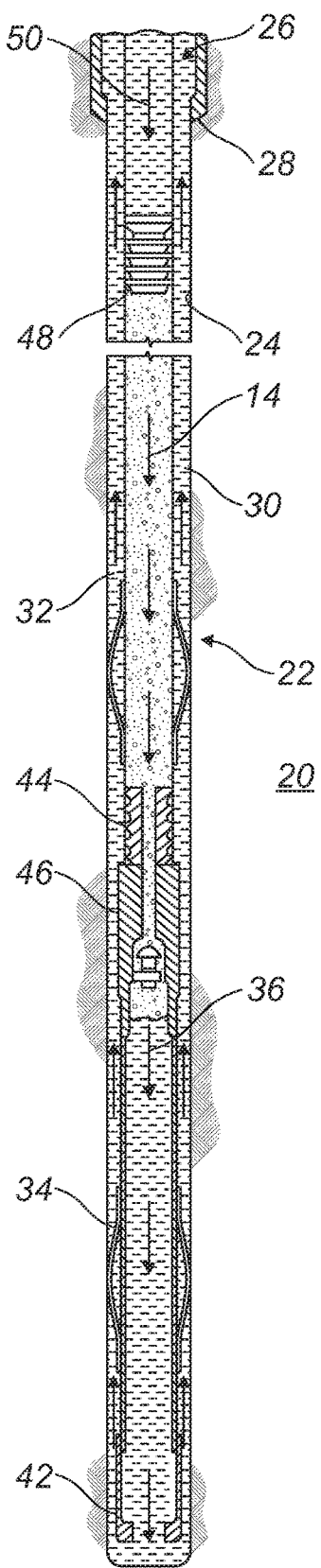
FIG. 2B is a schematic diagram that illustrates placement of a composition into a wellbore annulus in accordance with certain examples.

Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like Accordingly, this disclosure describes systems, methods, and compositions that may relate to subterranean operations. The systems, methods, and compositions may further be characterized by one or more of the following statements:

Statement 1: A method of cementing a portion of a wellbore comprising: providing a cement composition comprising: a hydraulic cement comprising a cementitious material, wherein the hydraulic cement comprises less than about 50% Portland cement by weight of the hydraulic cement, water, and a phosphorylated amino polycarboxylic acid cement retarder; placing the cement composition in a wellbore; and allowing the cement composition to set.

Statement 2: The method of statement 1, wherein the cementitious material is selected from at least one of pozzolan cement, cement kiln dust, and any combination thereof.

Statement 3: The method of statement 1 or 2, wherein the pozzolan cement is selected from at least one of fly ash, silica fume, metakaolin, natural glass, and any combination thereof.

Statement 4: The method of any of the preceding statements, wherein the phosphorylated amino polycarboxylic acid cement retarder is present in the cement composition in an amount of about 0.001% to about 5% by weight of hydraulic cement.

Statement 5: The method of any of the preceding statements, wherein the phosphorylated amino polycarboxylic acid cement retarder has the general formula below:

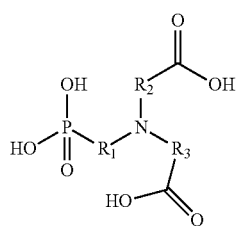

wherein $R_1$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, wherein $R_2$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl groups, a heteroatom substituted alkenyl group, and any combinations thereof, and wherein $R_3$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof.

Statement 6: The method of any of the preceding statements, wherein the phosphorylated amino polycarboxilic acid cement retarder is an N-Phosphonomethyl Iminodiacetic Acid.

Statement 7: The method of any of the preceding statements, wherein the phosphorylated amino polycarboxilic acid cement retarder comprises a number average molecular weight of from about 185 to about 400 g/mol.

Statement 8: The method of any of the preceding statements, wherein the cement composition is substantially free of Portland cement.

Statement 9: The method of any of the preceding statements, wherein the cement composition further comprises a dispersant, wherein providing the cement composition further comprises: storing the cement composition in a pumpable fluid state for at least about 1 day or longer; and mixing a chemical set activator into the cement composition.

Statement 10: The method of any of the preceding statements, wherein the cement composition further comprises a chemical set activator capable of inducing the composition to set into a hardened mass.

Statement 11: The method of any of the preceding statements, wherein the cement composition further comprises an additional retarder.

Statement 12: The method of any of the preceding statements, wherein the cement composition further comprises a strength retrogressive additive selected from at least one of coarse silica flour, fine silica flour, and any combination thereof.

Statement 13: The method of any of the preceding statements, wherein the cement composition further comprises a fluid loss additive selected from at least one of cellulosic materials such as hydroxyethyl cellulose and carboxymethylhydroxyethyl cellulose, copolymers of 2-acrylamido-2-methylpropanesulfonic acid and acrylamide or N,N-dimethylacrylamide, graft copolymers comprising a backbone of lignin or lignite and pendant groups comprising at least one member selected from the group consisting of 2-acrylamido-2-methylpropanesulfonic acid, acrylonitirile, N,N-dimethylacrylamide, and any combination thereof.

Statement 14: The method of any of the preceding statements, wherein the cement composition further comprises a viscosifying suspension additive selected from at least one of scierogiucan, carragenans, xanthan, welan, diutan gums, celluloses, hydroxyl ethyl celluloses, high molecular weight acrylamide polymers, acrylic acid-acrylamide co-polymers, acrylamide co-polymers, and any combination thereof.

Statement 15: A cement composition comprising: a hydraulic cement comprising a cementitious material, wherein the hydraulic cement comprises less than about 50% Portland cement by weight of the hydraulic cement; water; and a phosphorylated amino polycarboxylic acid cement retarder.

Statement 16: The composition of statement 15, wherein the cementitious material is selected from at least one of pozzolan cement, cement kiln dust, and any combination thereof, and wherein the pozzolan cement is selected from at least one of fly ash, silica fume, metakaolin, natural glass, and any combination thereof.

Statement 17: The composition of statement 15 or 16, wherein the phosphorylated amino polycarboxylic acid cement retarder is present in the cement composition in an amount of about 0.001% to about 5% by weight of the hydraulic cement.

Statement 18: The composition of any of the preceding statements, wherein the phosphorylated amino polycarboxilic acid cement retarder has the general formula below:

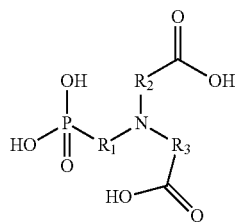

wherein $R_1$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, wherein $R_2$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl groups, a heteroatom substituted alkenyl group, and any combinations thereof, wherein $R_3$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, and wherein the phosphorylated amino polycarboxilic acid cement retarder comprises a number average molecular weight of from about 185 to about 400 g/mol.

Statement 19: The composition of any of the preceding statements, further comprising a dispersant, wherein the composition is substantially free of Portland cement, wherein the composition is a set-delay cement composition capable of remaining in a pumpable fluid state for at least about 1 day or longer.

Statement 20: The composition of any of the preceding statements, further comprising a chemical set activator capable of inducing the composition to set into a hardened mass.

To facilitate a better understanding of the present disclosure, the following examples of certain aspects of some of the systems, methods and cement compositions are given. In no way should the following examples be read to limit, or define, the entire scope of the disclosure.

Example 1

Three low-Portland cement compositions (samples 1-3) were prepared according to the API Recommended Practice for Testing Well Cements 10B-2, 2nd edition, April 2013 and are presented in Table 1. Sample 1 does not comprise a cement retarder. Samples 2 and 3 comprise a cement retarder. The amount of cement retarder present in sample 2 was adjusted to account for the aqueous state of the Amino Trimethylene Phosphonic Acid ("ATMP") Cement Retarder. Each sample has a density of about 13 lb/gal (ppg).

TABLE 1

| Low-Portland Cement Composition | | | |
|---|---|---|---|
| | Sample 1 (g) | Sample 2 (g) | Sample 3 (g) |
| Portland Cement | 211 | 211 | 211 |
| Fly Ash | 155 | 155 | 155 |

TABLE 1-continued

| Low-Portland Cement Composition | | | |
|---|---|---|---|
| | Sample 1 (g) | Sample 2 (g) | Sample 3 (g) |
| Cement Kiln Dust | 79 | 79 | 79 |
| Strength Retrogression Additive | 58 | 58 | 58 |
| Fluid Loss Additive | 0.89 | 0.89 | 0.89 |
| ATMP Cement Retarder | — | 1.33 | — |
| PMIDA Cement Retarder | — | — | 0.33 |
| Viscosifying Suspension Additive | 0.89 | 0.89 | 0.89 |
| Bentonite Clay | 22 | 22 | 22 |
| Mix Water | 407 | 407 | 407 |

Figure 3:
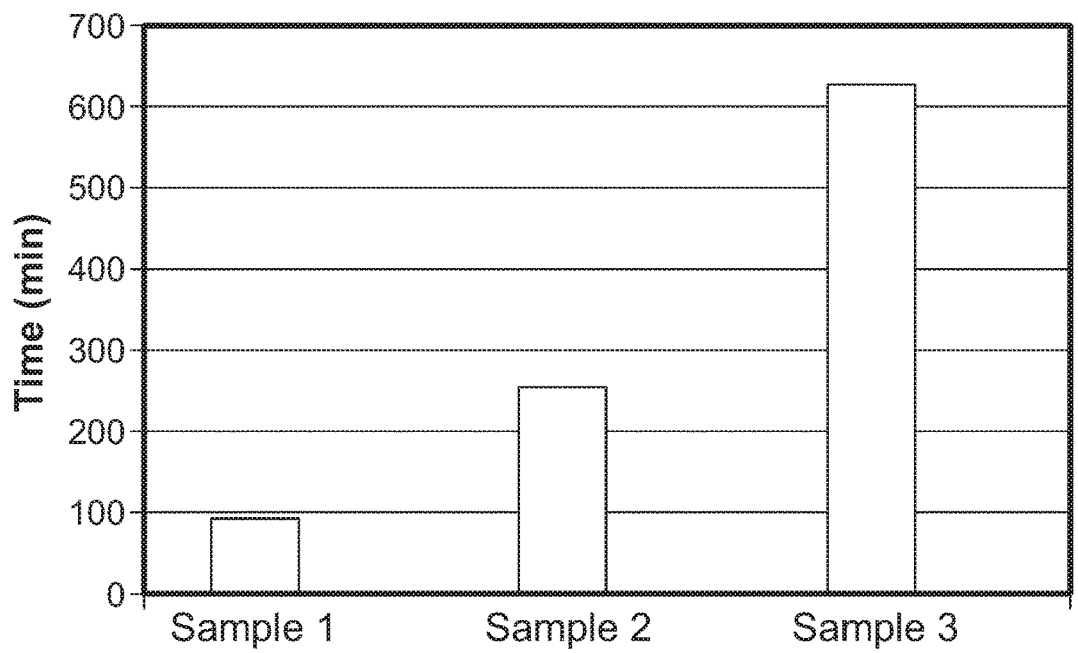
FIG. 3 is a graph that compares the thickening times of a low-Portland cement composition comprising a phosphorylated amino polycarboxylic acid cement retarder with other low-Portland cement compositions.

Samples 1-3 were tested to determine thickening time. Each sample was measured on a high-temperature high-pressure consistometer by ramping from room temperature (e.g., about 21° C. for this example) and ambient pressure to 130° C. and 7,000 psi in 43 minutes in accordance with the procedure for determining cement thickening times set forth in API RP Practice 10B-2, Recommended Practice for Testing Well Cements, 10B-2, 2nd edition, April 2013. The thickening time is the time for the cement composition to reach 70 Bc and may be reported as the time to reach 70 Bc. As one can observe from FIG. 3, the cement composition obtained using PMIDA cement retarder, sample 3, provides a longer thickening time than the other samples tested. The thickening time of sample 3 is about 2.6 times longer than sample 2, which comprises ATMP as the cement retarder. The thickening time of sample 3 is about 6.5 times longer than sample 3, which does not comprise a cement retarder.

Example 2

Three Non-Portland cement compositions (samples 4-6) were prepared according to the API Recommended Practice for Testing Well Cements 10B-2, 2nd edition, April 2013 and are presented in Table 2. Sample 4 does not comprise a cement retarder. Samples 5 and 6 comprise a cement retarder. The amount of cement retarder present in sample 5 was adjusted to account for the aqueous state of the ATMP Cement Retarder. Each sample has a density of about 12.5 lb/gal (ppg).

TABLE 2

| Non-Portland Cement Composition | | | |
|---|---|---|---|
| | Sample 4 (g) | Sample 5 (g) | Sample 6 (g) |
| Volcanic Glass | 605 | 605 | 605 |
| Hydrated Lime | 121 | 121 | 121 |
| ATMP Cement Retarder | — | 1.33 | — |
| PMIDA Cement Retarder | — | — | 0.33 |
| Viscosifying Suspension Additive | 0.05 | 0.05 | 0.05 |
| Mix Water | 534 | 534 | 534 |

Samples 4-6 were tested to determine thickening time. Each sample was measured on a high-temperature high-pressure consistometer by ramping from room temperature (e.g., about 21° C. for this example) and ambient pressure to 95° C. and 5,000 psi in 45 minutes in accordance with the procedure for determining cement thickening times set forth in API RP Practice 10B-2, Recommended Practice for Testing Well Cements 10B-2, 2nd edition, April 2013. The thickening time is the time for the cement composition to reach 70 Bc and may be reported as the time to reach 70 Bc.

Figure 4:
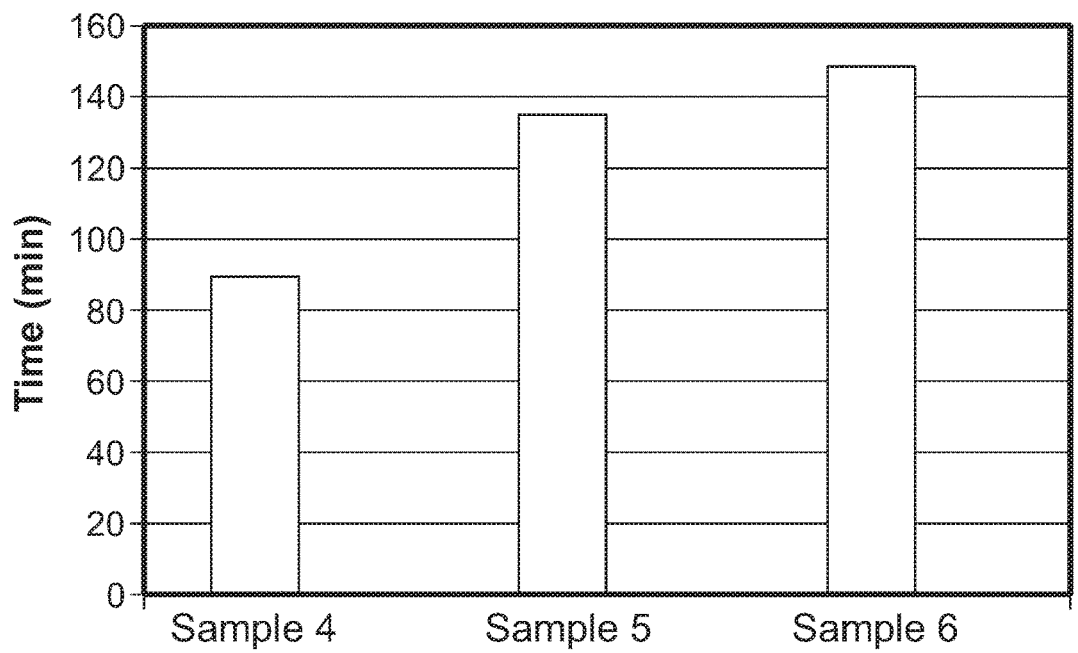
FIG. 4 is a graph that compares the thickening times of a non-Portland cement composition comprising a phosphorylated amino polycarboxylic acid cement retarder with other non-Portland cement compositions.

As one can observe from FIG. 4, the cement composition obtained using PMIDA cement retarder, sample 6, provides a longer thickening time than the other samples tested. Substituting PMIDA powder on a 1:1 weight basis with ATMP results in about a 10% increase in thickening time.

Example 3

Three Portland cement compositions (samples 7-9) were prepared according to the API Recommended Practice for Testing Well Cements 10B-2, 2nd edition, April 2013 and are presented in Table 3. Sample 7 does not comprise a cement retarder. Samples 8 and 9 comprise a cement retarder. The amount of cement retarder present in sample 8 was adjusted to account for the aqueous state of the Amino Trimethylene Phosphonic Acid Cement Retarder. Each sample has a density of about 13 lb/gal (ppg).

TABLE 3

Portland Cement Composition

|  | Sample 7 (g) | Sample 8 (g) | Sample 9 (g) |
|---|---|---|---|
| Portland Cement | 860 | 860 | 860 |
| ATMP Cement Retarder | — | 1.33 | — |
| PMIDA Cement Retarder | — | — | 0.33 |
| Viscosifying Suspension Additive | 0.86 | 0.86 | 0.86 |
| Mix Water | 327 | 327 | 327 |

Figure 5:
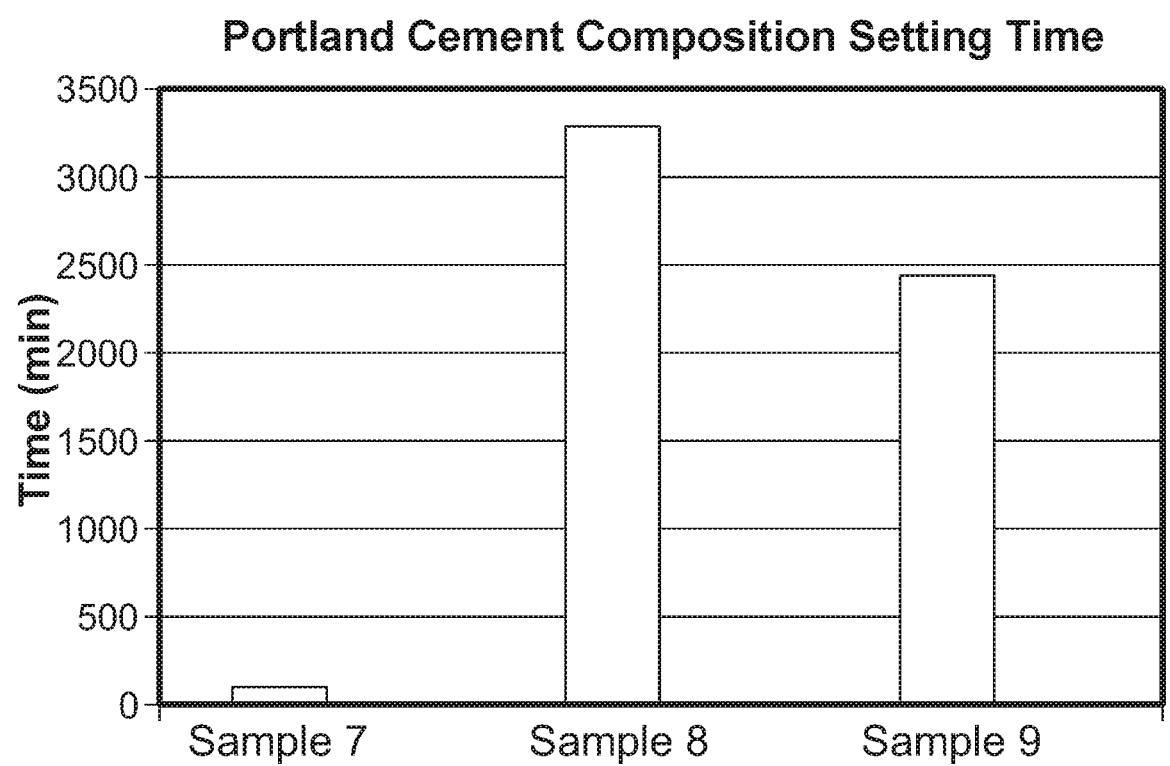
FIG. 5 is a graph that compares the thickening times of a Portland cement composition comprising a phosphorylated amino polycarboxylic acid cement retarder with other Portland cement compositions.

Samples 7-9 were tested to determine thickening time. Each sample was measured on a high-temperature high-pressure consistometer by ramping from room temperature (e.g., about 21° C. for this example) and ambient pressure to 50° C. and 5,000 psi in 28 minutes in accordance with the procedure for determining cement thickening times set forth in API RP Practice 10B-2, Recommended Practice for Testing Well Cements, 10B-2, 2nd edition, April 2013. The thickening time is the time for the cement composition to reach 70 Bc and may be reported as the time to reach 70 Bc. As one can observe from FIG. 5, the cement composition obtained using PMIDA cement retarder, sample 9, performs as an effective retarder in Portland cement compositions. However, unlike Examples 1 and 2 above, ATMP is a stronger retarder than PMIDA in Portland cement compositions.

Therefore, the present disclosure is well adapted to attain the ends and advantages mentioned as well as those that are inherent therein. The particular systems, methods and cement compositions disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative systems, methods and cement compositions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing a portion of a wellbore comprising:
   providing a cement composition comprising:
      a hydraulic cement comprising greater than 50% of a pozzolanic cementitious material by weight of the hydraulic cement, wherein the hydraulic cement comprises less than about 50% Portland cement by weight of the hydraulic cement,
      water, and
      a phosphorylated amino polycarboxylic acid cement retarder;
   placing the cement composition in a wellbore; and
   allowing the cement composition to set.

2. The method of claim 1, wherein the cementitious material further comprises cement kiln dust.

3. The method of claim 2, wherein the pozzolanic cementitious material is selected from at least one of fly ash, silica fume, metakaolin, natural glass, and any combination thereof.

4. The method of claim 1, wherein the phosphorylated amino polycarboxylic acid cement retarder is present in the cement composition in an amount of about 0.001% to about 5% by weight of hydraulic cement.

5. The method of claim 1, wherein the phosphorylated amino polycarboxilic acid cement retarder has the general formula below:

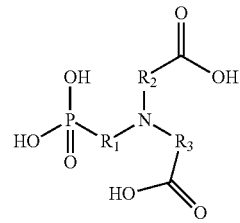

wherein $R_1$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, wherein $R_2$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl groups, a heteroatom substituted alkenyl group, and any combinations thereof, and wherein $R_3$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof.

6. The method of claim 1, wherein the phosphorylated amino polycarboxilic acid cement retarder is an N-Phosphonomethyl Iminodiacetic Acid.

7. The method of claim 1, wherein the phosphorylated amino polycarboxylic acid cement retarder comprises a number average molecular weight of from about 185 to about 400 g/mol.

8. The method of claim 1, wherein the cement composition is substantially free of Portland cement.

9. The method of claim 1, wherein the cement composition further comprises a dispersant, wherein providing the cement composition further comprises:
   storing the cement composition in a pumpable fluid state for at least about 1 day or longer; and
   mixing a chemical set activator into the cement composition.

10. The method of claim 1, wherein the cement composition further comprises a chemical set activator capable of inducing the composition to set into a hardened mass.

11. The method of claim 1, wherein the cement composition further comprises an additional retarder.

12. The method of claim 1, wherein the cement composition further comprises a strength retrogressive additive selected from at least one of coarse silica flour, fine silica flour, and any combination thereof.

13. The method of claim 1, wherein the cement composition further comprises a fluid loss additive selected from at least one of cellulosic materials such as hydroxyethyl cellulose and carboxymethylhydroxyethyl cellulose, copolymers of 2-acrylamido-2-methylpropanesulfonic acid and acrylamide or N,N-dimethylacrylamide, graft copolymers comprising a backbone of lignin or lignite and pendant groups comprising at least one member selected from the group consisting of 2-acrylamido-2-methylpropanesulfonic acid, acrylonitirile, N,N-dimethylacrylamide, and any combination thereof.

14. The method of claim 1, wherein the cement composition further comprises a viscosifying suspension additive selected from at least one of scleroglucan, carragenans, xanthan, welan, diutan gums, celluloses, hydroxyl ethyl celluloses, high molecular weight acrylamide polymers, acrylic acid-acrylamide co-polymers, acrylamide co-polymers, and any combination thereof.

15. A cement composition comprising:
   a hydraulic cement comprising greater than 50% of a pozzolanic cementitious material by weight of the hydraulic cement, wherein the hydraulic cement comprises less than about 50% Portland cement by weight of the hydraulic cement;
   water; and
   a phosphorylated amino polycarboxylic acid cement retarder.

16. The composition of claim 15, wherein the pozzolanic cementitious material is selected from at least one of fly ash, silica fume, metakaolin, natural glass, and any combination thereof.

17. The composition of claim 15, wherein the phosphorylated amino polycarboxylic acid cement retarder is present in the cement composition in an amount of about 0.001% to about 5% by weight of the hydraulic cement.

18. The composition of claim 15, wherein the phosphorylated amino polycarboxilic acid cement retarder has the general formula below:

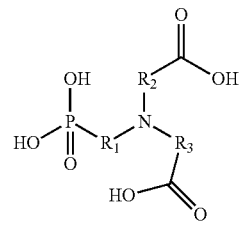

wherein $R_1$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, wherein $R_2$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl groups, a heteroatom substituted alkenyl group, and any combinations thereof, wherein $R_3$ is selected from at least one of an alkyl group, an alkenyl group, an alkynyl group, a branched alkyl, a branched alkenyl, a heteroatom substituted alkyl group, an alkyl alcohol, an alkoxylated heterocyclic group, a cycloalkyl group, a heteroatom substituted alkenyl group, and any combinations thereof, and wherein the phosphorylated amino polycarboxilic acid cement retarder comprises a number average molecular weight of from about 185 to about 400 g/mol.

19. The composition of claim 15, further comprising a dispersant, wherein the composition is substantially free of Portland cement, wherein the composition is a set-delay cement composition capable of remaining in a pumpable fluid state for at least about 1 day or longer.

20. The composition of claim 15, further comprising a chemical set activator capable of inducing the composition to set into a hardened mass.